United States Patent
Kikuchi et al.

(10) Patent No.: US 9,431,642 B2
(45) Date of Patent: Aug. 30, 2016

(54) MULTI-LAYER MICROPOROUS POLYOLEFIN MEMBRANE AND BATTERY SEPARATOR

(75) Inventors: Shintaro Kikuchi, Saitama (JP); Kotaro Takita, Nasushiobara (JP); Koichi Kono, Asaka (JP)

(73) Assignee: TORAY BATTERY SEPARATOR FILM CO., LTD., Nasushibara-shi, Tochigi (JP)

( * ) Notice: Subject to any disclaimer, the term of this patent is extended or adjusted under 35 U.S.C. 154(b) by 635 days.

(21) Appl. No.: 11/995,487

(22) PCT Filed: Jul. 14, 2006

(86) PCT No.: PCT/JP2006/314106
§ 371 (c)(1),
(2), (4) Date: Jan. 11, 2008

(87) PCT Pub. No.: WO2007/010878
PCT Pub. Date: Jan. 25, 2007

(65) Prior Publication Data
US 2009/0274955 A1    Nov. 5, 2009

(30) Foreign Application Priority Data
Jul. 15, 2005    (JP) .................................. 2005-207752

(51) Int. Cl.
*H01M 2/16*      (2006.01)
*B01D 67/00*     (2006.01)
(Continued)

(52) U.S. Cl.
CPC ........ *H01M 2/1653* (2013.01); *B01D 67/0027* (2013.01); *B01D 69/02* (2013.01);
(Continued)

(58) Field of Classification Search
CPC .................... H01M 2/1653; B01D 67/0027
USPC .............................. 429/144, 254; 428/315.5
See application file for complete search history.

(56) References Cited

U.S. PATENT DOCUMENTS

| 4,539,256 A | 9/1985 | Shipman |
| 4,867,881 A | 9/1989 | Kinzer |

(Continued)

FOREIGN PATENT DOCUMENTS

| JP | 10279718 A | 10/1998 |
| JP | 3235669 B2 | 9/2001 |

(Continued)

OTHER PUBLICATIONS

English Translation of International Preliminary Report on Patentability of PCT/JP2006/314106.

(Continued)

*Primary Examiner* — Larry Thrower
(74) *Attorney, Agent, or Firm* — Sughrue Mion, PLLC

(57) ABSTRACT

A multi-layer, microporous polyolefin membrane having at least three layers, which comprises first microporous layers made of a polyethylene resin for constituting at least both surface layers, and at least one second microporous layer comprising a polyethylene resin and polypropylene and disposed between both surface layers, the heat of fusion ($\Delta H_m$) of the polypropylene measured by differential scanning calorimetry being 90 J/g or more, and the polypropylene content in the second microporous layer being 50% or less by mass based on 100% by mass of the total of the polyethylene resin and the polypropylene.

4 Claims, 1 Drawing Sheet

(51) Int. Cl.
*B01D 69/02* (2006.01)
*B01D 69/12* (2006.01)
*B01D 71/26* (2006.01)
*B29C 55/02* (2006.01)
*B29C 55/16* (2006.01)
*B32B 27/32* (2006.01)
*B29K 23/00* (2006.01)
*B29K 105/04* (2006.01)
*H01M 10/0525* (2010.01)
*H01M 10/42* (2006.01)

(52) U.S. Cl.
CPC .............. *B01D 69/12* (2013.01); *B01D 71/26* (2013.01); *B29C 55/023* (2013.01); *B29C 55/16* (2013.01); *B32B 27/32* (2013.01); *H01M 2/1686* (2013.01); *B01D 2325/22* (2013.01); *B01D 2325/24* (2013.01); *B29K 2023/065* (2013.01); *B29K 2023/0683* (2013.01); *B29K 2105/04* (2013.01); *H01M 10/0525* (2013.01); *H01M 10/4235* (2013.01)

(56) References Cited

U.S. PATENT DOCUMENTS

| | | | |
|---|---|---|---|
| 5,856,039 A | 1/1999 | Takahashi | |
| 5,993,954 A * | 11/1999 | Radovanovic et al. | 428/315.5 |
| 2002/0136945 A1 | 9/2002 | Call et al. | |
| 2003/0035943 A1 * | 2/2003 | Jones et al. | 428/317.9 |
| 2005/0098913 A1 * | 5/2005 | Funaoka et al. | 264/41 |
| 2005/0228156 A1 | 10/2005 | Holland et al. | |
| 2007/0207376 A1 | 9/2007 | Call et al. | |

FOREIGN PATENT DOCUMENTS

| | | |
|---|---|---|
| JP | 2002-194132 A | 7/2002 |
| JP | 2002-321323 A | 11/2002 |
| JP | 2004-196870 A | 7/2004 |
| JP | 2004-196871 A | 7/2004 |
| JP | 3589778 B2 | 8/2004 |
| JP | 2004-538186 A | 12/2004 |
| WO | WO 2004/089627 A1 | 10/2004 |

OTHER PUBLICATIONS

Canadian Intellectual Property Office, "Office Action," issued in connection with Canadian Patent Application No. 2,615,495, dated Jan. 15, 2013.

Canadian Intellectual Property Office, "Office Action," issued in connection with Canadian Patent Application No. 2,615,495, dated Feb. 27, 2012.

European Patent Office, "Communication with Extended European Search Report," issued in connection with European Patent Application No. 06781131.5, dated Jun. 21, 2012.

* cited by examiner

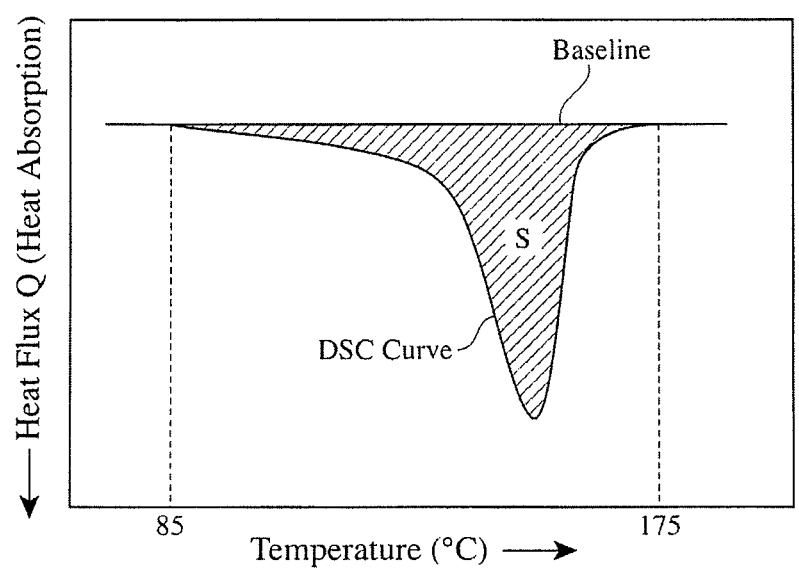

MULTI-LAYER MICROPOROUS POLYOLEFIN MEMBRANE AND BATTERY SEPARATOR

FIELD OF THE INVENTION

This invention relates to a multi-layer, microporous polyolefin membrane and a battery separator, particularly to a multi-layer, microporous polyolefin membrane having well-balanced shutdown properties and meltdown properties as well as good film formability and a battery separator.

BACKGROUND OF THE INVENTION

Microporous polyolefin membranes are widely used in separators for lithium batteries, etc., electrolytic capacitor separators, steam-permeable, waterproof clothing, various filters, etc. When the microporous polyolefin membranes are used as battery separators, their performance largely affects the performance, productivity and safety of batteries. Particularly lithium ion battery separators are required to have excellent mechanical properties and permeability, as well as a function of closing pores at the time of abnormal heat generation to stop a battery reaction [shutdown (SD) property], and a function of keeping the shape of the separators even at high temperatures to prevent the direct reaction of cathode materials and anode materials (dimensional stability), thereby preventing the heat generation, ignition, explosion, etc. of batteries that can occur by the short-circuiting of external circuits, overcharging, etc.

Japanese Patent 3235669 discloses a battery separator having excellent dimensional stability and SD property, which comprises at least one first layer made of a polymer selected from low-density polyethylene, an ethylene-butene copolymer and an ethylene-hexene copolymer, and at least one second layer made of a polymer selected from high-density polyethylene, ultra-high-molecular-weight polyethylene and polypropylene.

Japanese Patent 3589778 discloses a three-layer, porous laminate membrane comprising a porous polypropylene membrane sandwiched by porous membranes made of a mixture of polyethylene and polypropylene, the highest temperature of the membrane being equal to or lower than the melting point of polyethylene+20° C. when its temperature is elevated at a speed of 10 to 50° C./second by the resistance heat generation of an electrolytic solution impregnated into the membrane, that is caused by applying AC voltage to electrodes disposed on both surfaces of the electrolytic-solution-impregnated membrane, wherein the resistance of the porous membrane increases to such a level of shutting current immediately when polyethylene is melted.

WO 2004/089627 proposes a microporous polyolefin membrane having excellent permeability, high-temperature strength, high-temperature retention and safety as well as a low SD temperature and a high short-circuiting temperature, wherein the membrane comprises polyethylene and polypropylene as indispensable components and is constituted by two or more laminate films, wherein a polypropylene content in at least one surface layer is more than 50% by mass and 95% or less by mass, and wherein a polyethylene content in the entire membrane is 50% by mass to 95% by mass.

However, the microporous membrane containing polypropylene in at least one surface layer is poor in film formability and thickness uniformity. Specifically, when the microporous membrane is slit, a large amount of polypropylene powder is detached, resulting in defects such as pinholes and dots in the microporous membrane. The use of microporous membranes with poor thickness uniformity as batteries separators is likely to cause safety problems such as short-circuiting and low compression resistance, and a low yield leading to poor productivity of batteries. Microporous membranes containing polypropylene in surface layers also suffer from high SD temperatures and low SD speeds.

JP2002-194132 A proposes a microporous polyolefin membrane containing polyethylene and polypropylene and having excellent flatness and compression properties, wherein the microporous polyolefin membrane comprises polypropylene having MFR of 2.0 or less, and polyethylene having a ratio (mass-average molecular weight/number-average molecular weight) of 8 to 100, and wherein the polypropylene content is 20% or less by mass.

JP2004-196870 A proposes a microporous polyolefin membrane, having well-balanced thickness uniformity, mechanical properties, permeability, dimensional stability, shutdown properties and meltdown properties, wherein the microporous polyolefin membrane comprises polyethylene, and polypropylene having a mass-average molecular weight of $5\times10^5$ or more and a heat of fusion of 90 J/g or more when measured by differential scanning calorimetry, and wherein the polypropylene content is 20% or less by mass. JP2004-196871 A proposes a microporous polyolefin membrane comprises polyethylene, and polypropylene having a mass-average molecular weight of $5\times10^5$ or more, and a melting point of 163° C. or higher when measured by differential scanning calorimetry at a temperature-elevating speed of 3 to 20° C./minute, wherein the polypropylene content is 20% or less by mass. However, the microporous polyolefin membranes of these references do not have sufficient SD property.

JP2002-321323 A proposes a microporous polyolefin membrane having excellent safety and strength, wherein the microporous polyolefin membrane has an integrally laminated three-layer structure of A/B/A or B/A/B, and wherein A represents a microporous membrane comprising polyethylene and polypropylene as indispensable components, and B represents a microporous polyethylene membrane. However, all Examples in this reference are directed to microporous membranes having a three-layer structure of A/B/A, failing to show the three-layer structure of B/A/B. In addition, since polypropylene in the microporous membrane A does not have optimized properties, this microporous polyolefin membrane can not necessarily have satisfactory SD property.

OBJECT OF THE INVENTION

Accordingly, an object of this invention is to provide a multi-layer, microporous polyolefin membrane having well-balanced shutdown properties and meltdown properties as well as good film formability, and a battery separator.

DISCLOSURE OF THE INVENTION

As a result of intense research in view of the above object, the inventors have found that when a multi-layer, microporous polyolefin membrane having at least three layers is constituted by both surface layers composed of only a polyethylene resin, and an inner layer composed of a polyethylene resin and polypropylene at controlled proportions, the polypropylene having a heat of fusion ($\Delta H_m$) of 90 J/g or more when measured by differential scanning calorimetry, the multi-layer, microporous polyolefin membrane shows a low shutdown temperature, a high shutdown speed and a high meltdown temperature, as well as excellent film formability. This invention has been completed based on such finding.

Thus, the multi-layer, microporous polyolefin membrane of this invention has at least three layers, comprising first microporous layers made of a polyethylene resin for constituting at least both surface layers, and at least one second microporous layer comprising a polyethylene resin and polypropylene and disposed between both surface layers, wherein the heat of fusion ($\Delta H_m$) of the polypropylene measured by differential scanning calorimetry is 90 J/g or more, and the polypropylene content in the second microporous layer is 50% or less by mass based on 100% by mass of the total of the polyethylene resin and the polypropylene.

The heat of fusion of the polypropylene is preferably 95 J/g or more. The polypropylene content in the second microporous layer is preferably 3 to 45% by mass, more preferably 15 to 45% by mass, based on 100% by mass of the total of the polyethylene resin and the polypropylene.

The solid mass ratio of the first microporous layer to the second microporous layer is preferably 90/10 to 10/90, more preferably 80/20 to 40/60.

To obtain a multi-layer, microporous polyolefin membrane having excellent properties, the polyethylene resin in the first and second microporous layers preferably meet the following conditions.

(1) The above polyethylene resin is preferably (a) ultra-high-molecular-weight polyethylene, (b) polyethylene other than the ultra-high-molecular-weight polyethylene, (c) a composition of the ultra-high-molecular-weight polyethylene and polyethylene other than the ultra-high-molecular-weight polyethylene (polyethylene composition), or (d) a composition comprising any one of the components (a) to (c), and a polyolefin other than polyethylene and polypropylene, more preferably (c) the polyethylene composition.

(2) The polyethylene composition described in the above (1) preferably comprises ultra-high-molecular-weight polyethylene having a mass-average molecular weight of $5 \times 10^5$ or more, and polyethylene having a mass-average molecular weight of $1 \times 10^4$ or more and less than $5 \times 10^5$.

(3) The ultra-high-molecular-weight polyethylene in the polyethylene composition described in the above (2) preferably has a mass-average molecular weight of $1 \times 10^6$ to $15 \times 10^6$, particularly $1 \times 10^6$ to $5 \times 10^6$.

(4) The ultra-high-molecular-weight polyethylene in the polyethylene composition described in the above (1) is preferably an ethylene homopolymer, or an ethylene-α-olefin copolymer containing a small amount of an α-olefin other than ethylene.

(5) The polyethylene having a mass-average molecular weight of $1 \times 10^4$ or more and less than $5 \times 10^5$, which is contained in the polyethylene composition described in the above (2), is preferably at least one selected from the group consisting of high-density polyethylene, intermediate-density polyethylene, branched low-density polyethylene, and linear low-density polyethylene.

(6) The polyethylene having a mass-average molecular weight of $1 \times 10^4$ or more and less than $5 \times 10^5$, which is contained in the polyethylene composition described in the above (5), is preferably high-density polyethylene.

(7) The above polyethylene resin preferably has a mass-average molecular weight of $1 \times 10^4$ to $1 \times 10^7$ and Mw/Mn of 5 to 300, in any case.

To obtain a multi-layer, microporous polyolefin membrane having excellent properties, the polypropylene in the second microporous layer preferably meets the following conditions.

(1) The mass-average molecular weight of the above polypropylene is preferably $1 \times 10^4$ to $4 \times 10^6$, more preferably $1 \times 10^5$ to $9 \times 10^5$, particularly $5 \times 10^5$ to $9 \times 10^5$.

(2) The above polypropylene preferably has Mw/Mn of 1.01 to 100.

(3) The melting point of the above polypropylene is preferably 155 to 175° C., more preferably 163 to 175° C.

The multi-layer, microporous polyolefin membrane of this invention having the above features preferably has a porosity of 25 to 80%, air permeability of 20 to 400 seconds/100 cm$^3$ (converted to the value at 20-μm thickness), pin puncture strength of 3,000 mN/20 μm or more, tensile rupture strength of 100,000 kPa or more, tensile rupture elongation of 100% or more, heat shrinkage ratio of 10% or less (after exposed to 105° C. for 8 hours), a shutdown temperature of 140° C. or lower, a shutdown speed of 10 seconds or less (135° C.), and a meltdown temperature of 160° C. or higher.

The battery separator of this invention is formed by the above multi-layer, microporous polyolefin membrane.

BRIEF DESCRIPTION OF THE DRAWING

FIG. 1 is a graph showing a typical DSC curve.

DESCRIPTION OF THE PREFERRED EMBODIMENTS

[1] Multi-Layer, Microporous Polyolefin Membrane

The multi-layer, microporous polyolefin membrane of this invention, (which can be called simply "multi-layer microporous membrane" below), has at least three layers, comprising first microporous layers made of a polyethylene resin for constituting at least both surface layers, and at least one second microporous layer comprising a polyethylene resin and polypropylene and disposed between both surface layers.

(A) First Microporous Layer
(1) Polyethylene Resin

The polyethylene resin forming the first microporous layer is preferably a composition of the ultra-high-molecular-weight polyethylene and polyethylene other than the ultra-high-molecular-weight polyethylene (polyethylene composition). The ultra-high-molecular-weight polyethylene has a mass-average molecular weight (Mw) of $5 \times 10^5$ or more. The ultra-high-molecular-weight polyethylene can be an ethylene homopolymer or an ethylene-α-olefin copolymer containing a small amount of other α-olefins. The other α-olefins than ethylene are preferably propylene, butene-1, pentene-1, hexene-1,4-methylpentene-1, octene-1, vinyl acetate, methyl methacrylate, and styrene. The Mw of the ultra-high-molecular-weight polyethylene is preferably $1 \times 10^6$ to $15 \times 10^6$, more preferably $1 \times 10^6$ to $5 \times 10^6$. The ultra-high-molecular-weight polyethylene can be a single substrate, or can be a mixture of two or more types of the ultra-high-molecular-weight polyethylene. The mixture can be composed of two or more types of the ultra-high-molecular-weight polyethylene having different Mws.

The polyethylene other than the ultra-high-molecular-weight polyethylene has Mw of $1 \times 10^4$ or more and less than $5 \times 10^5$, being preferably at least one selected from the group consisting of high-density polyethylene, intermediate-density polyethylene, branched low-density polyethylene and linear low-density polyethylene, more preferably high-density polyethylene. The polyethylene having Mw of $1 \times 10^4$ or more and less than $5 \times 10^5$ can not only be an ethylene homopolymer, but can be a copolymer containing a small amount of other α-olefins such as propylene, butene-1, hexene-1, etc. Such copolymers are preferably produced using single-site catalysts. The other polyethylene than the ultra-high-molecular-weight polyethylene can not only be a single substrate, but can be a mixture of two or more types of polyethylene other than the ultra-high-molecular-weight polyethylene, although it is not critical. The mixture can be composed of two or more types of high-density polyethylene having different Mws, similar types of intermediate-density polyethylene, similar types of low-density polyethylene, etc.

The content of the ultra-high-molecular-weight polyethylene in the polyethylene composition is preferably 1% or more by mass, more preferably 10 to 80% by mass, based on 100% by mass of the overall polyethylene composition.

The polyethylene resin can be the above polyethylene composition, but only the above ultra-high-molecular-weight polyethylene or polyethylene other than the above ultra-high-molecular-weight polyethylene can be used, if necessary.

The polyethylene resin can contain polyolefins other than polyethylene and polypropylene (hereinafter called "other polyolefins" unless otherwise mentioned), if necessary. The other polyolefin can be at least one selected from the group consisting of polybutene-1, polypentene-1, polyhexene-1, polyoctene-1 and an ethylene-α-olefin copolymer each having Mw of $1 \times 10^4$ to $4 \times 10^6$, and polyethylene wax having Mw of $1 \times 10^3$ to $1 \times 10^4$. Polybutene-1, polypentene-1, polyhexene-1 and polyoctene-1 can be homopolymers or copolymers containing other α-olefins. The content of the other polyolefin is preferably 20% or less by mass, more preferably 10% or less by mass, based on 100% by mass of the entire polyethylene resin.

Though not particularly critical in any cases, the Mw of the polyethylene resin is preferably $1 \times 10^4$ to $1 \times 10^7$, more preferably $5 \times 10^4$ to $15 \times 10^6$, particularly $1 \times 10^5$ to $5 \times 10^6$. When the Mw of the polyethylene resin is $15 \times 10^6$ or less, it can be easy to operate melt extrusion.

When the polyethylene resin is the above polyethylene composition, the ultra-high-molecular-weight polyethylene, or polyethylene other than the ultra-high-molecular-weight polyethylene, the Mw/Mn of the polyethylene resin is preferably 5 to 300, more preferably 10 to 100, though not critical. When the Mw/Mn is less than 5, there are excessive high-molecular weight components, resulting in difficulty in melt extrusion. When the Mw/Mn is more than 300, there are excessive low-molecular weight components, resulting in a multi-layer microporous membrane with reduced strength. Mw/Mn is a measure of a molecular weight distribution, the larger this value, the wider the molecular weight distribution. The Mw/Mn of the polyethylene (homopolymer and ethylene-α-olefin copolymer) can be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn, the larger difference in Mw between the ultra-high-molecular-weight polyethylene and the other polyethylene, and vice versa. The Mw/Mn of the polyethylene composition can be properly controlled by the molecular weight and percentage of each component.

(2) Composition of Both Surface Layers

The first microporous layers forming both surface layers can have the same or different compositions, though the same composition is preferable.

(3) Number of Layers

The first microporous layers need only be disposed on both surfaces, but three or more first microporous layers can be used, if necessary. For instance, the first microporous layer having a different composition from that of both surface layers can be disposed between the surface layers together with the second microporous layer.

(4) Function of the First Microporous Layer

With both surface layers constituted by the first microporous layer, the multi-layer, the microporous polyolefin membrane has a low SD temperature and a high SD speed.

(B) Second Microporous Layer (1) Polyolefin Composition

The polyolefin composition forming the second microporous layer comprises, as indispensable components, the polyethylene resin, and polypropylene having a heat of fusion of 90 J/g or more when measured by differential scanning calorimetry.

(a) Polyethylene Resin

The polyethylene resin in the second microporous layer can be the same as above. The composition of the polyethylene resin in the second microporous layer can be the same as or different from that of the polyethylene resin in the first microporous layer, and can be properly selected depending on the desired properties.

(b) Polypropylene

The polypropylene should have a heat of fusion $\Delta H_m$ of 90 J/g or more when measured by differential scanning calorimetry (DSC) according to JIS K7122. A temperature-elevating speed at the time of measuring the heat of fusion is preferably 3 to 20° C./minute, or usually 10° C./minute. When the heat of fusion $\Delta H_m$ of the polypropylene is less than 90 J/g, the multi-layer, microporous membrane has poor meltdown properties and pin puncture strength. Further, polypropylene can have low dispersibility when being formed into a sheet, resulting in large micro-roughness on the second microporous layer surface, so that the multi-layer, microporous membrane has large thickness deviation. The heat of fusion ($\Delta H_m$) is more preferably 95 J/g or more.

As long as the above requirement of the heat of fusion is met, the type of polypropylene can be a propylene homopolymer, a copolymer of propylene and other α-olefin and/or diolefin, a mixture thereof, although it is not critical and the type of polypropylene is preferably a homopolymer. The copolymer can be a random copolymer or a block copolymer. The α-olefin preferably has 8 or less carbon atoms. The α-olefins having 8 or less carbon atoms include ethylene, butene-1, pentene-1,4-methylpentene-1, octene-1, vinyl acetate, methyl methacrylate, styrene, etc. The diolefin preferably has 4 to 14 carbon atoms. The diolefins having 4 to 14 carbon atoms include, for instance, butadiene, 1,5-hexadiene, 1,7-octadiene, 1,9-decadiene, etc. The content of the other α-olefin or diolefin is preferably less than 10% by mole based on 100% by mole of the propylene copolymer.

The Mw of the polypropylene is preferably $1 \times 10^4$ to $4 \times 10^6$, more preferably $1 \times 10^5$ to $9 \times 10^5$, particularly $5 \times 10^5$ to $9 \times 10^5$. The use of polypropylene having Mw of less than $1 \times 10^4$ results in low meltdown properties. On the other hand, the use of polypropylene having Mw of more than $4 \times 10^6$ results in difficulty in blending with the polyethylene resin. The molecular weight distribution (Mw/Mn) of the polypropylene is preferably 1.01 to 100, more preferably 1.1 to 50. The melting point of the polypropylene is preferably 155 to 175° C., more preferably 163° to 175° C. The melting point can be measured according to JIS K7121.

To improve film formability, powdery polypropylene can be used. The powdery polypropylene preferably has an average particle size of 100 to 2,000 µm, and a particle size distribution of 50 to 3,000. The average particle size and particle size distribution can be measured according to JIS K0069.

(c) Other Heat-Resistant Polymer

The polyolefin composition can contain other heat-resistant polymers than polypropylene, if necessary. The other heat-resistant polymers than polypropylene (hereinafter called simply "heat-resistant polymer" unless otherwise mentioned) are preferably crystalline polymers (including partially crystalline resins) having melting points of 150° C. or higher, and/or amorphous polymers having Tg of 150° C. or higher. Tg can be measured according to JIS K7121.

Specific examples of the heat-resistant polymer include polyesters, polymethylpentene [PMP or TPX (transparent polymer X), melting point: 230 to 245° C.], polyamides (PA, melting points: 215 to 265° C.), polyarylene sulfides (PAS), fluororesins, polystyrene (PS, melting point: 230° C.), polyvinyl alcohol (PVA, melting point: 220 to 240° C.), polyimides (PI, Tg: 280° C. or higher), polyamideimides (PAI, Tg: 280° C.), polyethersulfone (PES, Tg: 223° C.), polyetheretherketone (PEEK, melting point: 334° C.), polycarbonates (PC, melting points: 220 to 240° C.), cellulose acetate (melting point: 220° C.), cellulose triacetate (melting point: 300° C.), polysulfone (Tg: 190° C.), polyetherimides (melting point: 216° C.), etc. The heat-resistant polymer can not only be a single resin component, but can be composed of pluralities of resin components. The Mw of the heat-resistant resin is generally $1\times10^3$ to $1\times10^6$, preferably $1\times10^4$ to $7\times10^5$, though variable depending on the type of the resin.

The polyesters include polybutylene terephthalate (PBT, melting point: about 160 to 230° C.), polyethylene terephthalate (PET, melting point: about 250 to 270° C.), polyethylene naphthalate (PEN, melting point: 272° C.), polybutylene naphthalate (PBN, melting point: 245° C.), etc., and PBT is preferable. PBT preferably has Mw of $2\times10^4$ to $3\times10^5$.

PMP is preferably a homopolymer of 4-methyl-1-pentene. PMP preferably has Mw of $3\times10^5$ to $7\times10^5$. PA is preferably at least one selected from the group consisting of polyamide 6 (6-nylon), polyamide 66 (6,6-nylon), polyamide 12 (12-nylon) and amorphous polyamide. PAS is preferably polyphenylene sulfide (PPS, melting point: 285° C.).

The fluororesins include polyvinylidene fluoride (PVDF, melting point: 171° C.), polytetrafluoroethylene (PTFE, melting point: 327° C.), a tetrafluoroethylene-perfluoroalkylvinyl ether copolymer (PFA, melting point: 310° C.), a tetrafluoroethylene-hexafluoropropylene-perfluoro(propylvinyl ether) copolymer (EPE, melting point: 295° C.), a tetrafluoroethylene-hexafluoropropylene copolymer (FEP, melting point: 275° C.), an ethylene-tetrafluoroethylene copolymer (ETFE, melting point: 270° C.), etc. Among them, PVDF is preferable.

(d) Formulation

The polypropylene content is 50% or less by mass, based on 100% by mass of the total of the polyethylene resin and the polypropylene. The polypropylene content of more than 50% by mass results in an elevated SD temperature, a decreased SD speed, and reduced film formability. Specifically, it provides an SD temperature exceeding 140° C., and an increased amount of polypropylene powder detaching when the multi-layer, microporous membrane is slit. A large amount of the detached polypropylene powder is likely to cause defects such as pinholes, dots, etc. in multi-layer, microporous membrane products. This content is preferably 3 to 45% by mass, more preferably 15 to 45% by mass. When this content is less than 3% by mass, the meltdown properties decrease. The heat-resistant polymer content is preferably 20% or less by mass, based on 100% by mass of the total of the polyethylene resin, the polypropylene and the heat-resistant polymer.

(2) Number of Layers

A second microporous layer is usually enough, though pluralities of second microporous layers can be used, if necessary. For instance, pluralities of second microporous layers having different compositions can be disposed.

(3) Function of Second Microporous Layer

At least one second microporous layer between both surface layers provides the multi-layer, microporous polyolefin membrane with good meltdown properties.

(C) Examples of Layer Structures and Ratio of First and Second Microporous Layers Though not critical, the multi-layer, microporous polyolefin membrane preferably has a three-layer structure of the first microporous layer, the second microporous layer and the first microporous layer. Though not critical, the solid mass ratio of the first microporous layer to the second microporous layer is preferably 90/10 to 10/90, more preferably 80/20 to 40/60.

[2] Production Method of Multi-Layer, Microporous Polyolefin Membrane (A) First Production Method A first method for producing the multi-layer, microporous polyolefin membrane of this invention comprises a step (1) of melt-blending the above polyethylene resin and a membrane-forming solvent to prepare a first melt blend (first polyolefin solution), and melt-blending the above polyolefin composition and a membrane-forming solvent to prepare a second melt blend (second polyolefin solution), a step (2) of extruding the first and second polyolefin solutions through separate dies and cooling each extrudate to form a gel-like sheet, a step (3) of stretching each gel-like sheet, a step (4) of removing the membrane-forming solvent, a step (5) of drying the resultant membrane, and a step (6) of laminating the resultant first and second microporous polyolefin membranes. After the step (6), if necessary, a step (7) of stretching a multi-layer, microporous membrane, a heat-treating step (8), a cross-linking step (9) with ionizing radiations, a hydrophilizing step (10), etc. can be conducted.

(1) Preparation of Polyolefin Solution (a) Preparation of First Polyolefin Solution The polyethylene resin and a proper membrane-forming solvent are melt-blended to prepare a first polyolefin solution. The first polyolefin solution can contain various additives such as antioxidants, ultraviolet absorbents, antiblocking agents, pigments, dyes, inorganic fillers, etc., if necessary, in ranges not deteriorating the effects of this invention. Fine silicate powder, for instance, can be added as a pore-forming agent.

The membrane-forming solvent can be liquid or solid. The liquid solvents can be aliphatic or cyclic hydrocarbons such as nonane, decane, decalin, p-xylene, undecane, dodecane, liquid paraffin, etc.; and mineral oil distillates having boiling points corresponding to those of the above hydrocarbons. To obtain a gel-like sheet having a stable solvent content, non-volatile liquid solvents such as liquid paraffin are preferable. The solid solvent preferably has melting point of 80° C. or lower. Such solid solvents are paraffin wax, ceryl alcohol, stearyl alcohol, dicyclohexyl phthalate, etc. The liquid solvent and the solid solvent can be used in combination.

The viscosity of the liquid solvent is preferably 30 to 500 cSt, more preferably 30 to 200 cSt, at a temperature of 25° C. When this viscosity is less than 30 cSt, the polyethylene solution is unevenly extruded through a die lip, resulting in difficulty in blending. The viscosity of more than 500 cSt makes the removal of the liquid solvent difficult.

Though not particularly critical, the uniform melt-blending of the first polyolefin solution is preferably conducted in a double-screw extruder. Melt-blending in a double-screw extruder is suitable for preparing a high-concentration polyolefin solution. When the polyethylene resin is a polyethylene composition, the melt-blending temperature is preferably the melting point of the polyethylene composition+10° C. to the melting point +100° C. Specifically, the melt-blending temperature is preferably in a range of 140° to 250° C., more preferably in a range of 170 to 240° C. The membrane-forming solvent can be added before blending, or charged into the double-screw extruder at an intermediate position during blending, though the latter is preferable. In the melt-blending, an antioxidant is preferably added to prevent the oxidization of the polyethylene resin.

The content of the polyethylene resin in the first polyolefin solution is preferably 10 to 50% by mass, more preferably 20 to 45% by mass, based on 100% by mass of the total of the polyethylene resin and the membrane-forming solvent. Less than 10% by mass of the polyethylene resin content causes large swelling and neck-in at the die exit in the extrusion of the first polyolefin solution, resulting in decrease in the formability and self-supportability of the extruded molding (gel-like molding). More than 50% by mass of the polyethylene resin content deteriorates the formability of the gel-like molding.

(b) Preparation of Second Polyolefin Solution

The second polyolefin solution is prepared by melt-blending the polyolefin composition with the above membrane-forming solvent. The second polyolefin solution can be prepared in the same manner as in the first polyolefin solution, except that when the polyolefin composition is composed of the polyethylene resin and the polypropylene, the melt-blending temperature is preferably in a range from the melting point of polypropylene to the melting point +70° C., and that when the polyolefin composition is composed of the polyethylene resin, the polypropylene and the heat-resistant polymer, the melt-blending temperature is preferably equal to or higher than the melting point of the heat-resistant, crystalline polymer, or Tg of the heat-resistant, amorphous polymer, selectable depending on the type of the heat-resistant polymer.

(2) Formation of Gel-Like Sheet

Each of the first and second melt-blended polyolefin solutions is extruded through the die of the extruder directly or through a die of another extruder, or once cooled to pellets and extruded through a die of an extruder again. Although a sheet-forming die having a rectangular orifice is usually used, a double-cylindrical die, an inflation die, etc. can also be used. The sheet-forming die usually has a die gap of 0.1 to 5 mm, and is heated at 140 to 250° C. during extrusion. The extrusion speed of the heated solution is preferably 0.2 to 15 m/minute.

A gel-like molding of each polyolefin solution extruded through the die is cooled to obtain first and second gel-like sheets. The cooling is preferably conducted at a speed of 50° C./minute or more till the above gel-like molding has at least a temperature of a gelation temperature. The cooling is preferably conducted to 25° C. or lower. The micro-phase separation of a polymer phase (a polyethylene resin phase in the first gel-like sheet, and a polyolefin composition phase in the second gel-like sheet) is thus fixed by the membrane-forming solvent. In general, a low cooling speed provides the gel-like sheet with a coarse high-order structure, and large pseudo-cell units constituting the high-order structure, while a high cooling speed provides dense cell units. The cooling speed of less than 50° C./minute increases the crystallization of polyethylene, making it difficult to form a stretchable gel-like sheet. The cooling can be a method of direct contacting with cooling air, cooling water or other cooling media, a method of contacting with rolls cooled by a cooling medium, etc.

(3) Stretching of Gel-Like Sheet

The resultant first and second gel-like sheets are stretched in at least one direction. Because each gel-like sheet contains a membrane-forming solvent, it can be uniformly stretched. After heating, each gel-like sheet is stretched to a predetermined magnification by a tenter method, a roll method, an inflation method, a rolling method, or combination thereof. Although the stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is preferable.

The stretching magnification is preferably 2-fold or more, more preferably 3-fold to 30-fold in the case of monoaxial stretching. In the case of biaxial stretching, the stretching magnification is at least 3-fold in both directions, with an area magnification of preferably 9-fold or more, more preferably 25-fold or more. The area magnification of less than 9-fold results in insufficient stretching, failing to providing a high-modulus, high-strength microporous membrane. When the area magnification is more than 400-fold, restrictions occur on stretching apparatuses, stretching operations, etc. In the case of biaxial stretching, the upper limit of the stretching magnification is preferably 10-fold in both directions, namely 100-fold in area magnification.

When each polyethylene resin in the first and second gel-like sheets is the polyethylene composition, the stretching temperature is preferably the melting point of the polyethylene composition+10° C. or lower, more preferably in a range of the crystal dispersion temperature or higher and lower than melting point. When this stretching temperature is higher than the melting point +10° C., the stretched molecular chains have poor orientation. When the stretching temperature is lower than the crystal dispersion temperature, the resin is so insufficiently softened that rupture is likely to occur in stretching, thus failing to achieve high-magnification stretching. The crystal dispersion temperature is determined by measuring the temperature properties of dynamic viscoelasticity according to ASTM D 4065. The ultra-high-molecular-weight polyethylene and the other polyethylene than that have crystal dispersion temperatures of about 90 to 100° C. and melting points of about 130 to 140° C. Thus, the stretching temperature is usually in a range of 90 to 140° C., preferably in a range of 100 to 130° C.

Depending on the desired properties, stretching can be conducted with a temperature distribution in a thickness direction, to provide a microporous membrane with higher mechanical strength. This method is described specifically in Japanese Patent 3347854.

The above stretching causes cleavage between polyethylene crystal lamellas, making the polyethylene resin phases finer with larger numbers of fibrils. The fibrils form a three-dimensional network structure (three-dimensionally and irregularly connected network structure).

(4) Removal of Membrane-Forming Solvent

The liquid solvent is removed (washed away) using a washing solvent. Because the polymer phase (polyethylene resin phase in the first gel-like sheet, and polyolefin composition phase in the second gel-like sheet) is separated from the membrane-forming solvent phase, the microporous membrane is obtained by removing the membrane-forming solvent. The removal (washing away) of the liquid solvent can be conducted by using known washing solvents. The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a microporous membrane having high porosity and permeability.

The washing of each stretched gel-like sheet can be conducted by a washing-solvent-immersing method, a washing-solvent-showering method, or a combination thereof. The amount of the washing solvent used is preferably 300 to 30,000 parts by mass per 100 parts by mass of the stretched membrane. Washing with the washing solvent is preferably conducted until the amount of the remaining membrane-forming solvent becomes less than 1% by mass of that added.

(5) Drying of Membrane

Each microporous polyolefin membrane obtained by stretching and the removal of the membrane-forming solvent is then dried by a heat-drying method, a wind-drying method, etc. When the polyethylene resin in each microporous polyolefin membrane is the polyethylene composition, the drying temperature is preferably equal to or lower than the crystal dispersion temperature of the polyethylene composition, particularly 5° C. or more lower than the crystal dispersion temperature. Drying is conducted until the percentage of the remaining washing solvent becomes preferably 5% or less by mass, more preferably 3% or less by mass, based on 100% by mass of the dried microporous membrane. Insufficient drying undesirably reduces the porosity of the microporous membrane in a subsequent heat lamination, thereby resulting in poor permeability.

(6) Lamination

The dried first and second microporous polyolefin membranes are laminated, such that at least both surface layers are constituted by the first microporous polyolefin membrane, and that at least one second microporous polyolefin membrane is disposed between both surface layers. To produce a three-layer microporous membrane, the dried first microporous polyolefin membranes are laminated on both surfaces of the second microporous polyolefin membrane.

Though not critical, the lamination method is preferably a heat lamination method. The heat lamination method includes a heat-sealing method, an impulse-sealing method, an ultrasonic-bonding method, etc., and the heat-sealing method is preferable. A hot-rolling method is more preferable, though not critical. In the hot-rolling method, the laminated first and second microporous polyolefin membranes are heat-sealed by passing between a pair of heated rolls, or between a heated roll and a plate. The heat-sealing temperature and pressure are not particularly critical but can be properly set, as long as the microporous polyolefin membranes are fully bonded to provide a multi-layer, microporous membrane with satisfactory properties. The heat-sealing temperature is, for instance, 90 to 135° C., preferably 90 to 115° C. The heat-sealing pressure is preferably 0.1 to 50 MPa, though not critical.

(7) Stretching of Multi-Layer, Microporous Membrane

The multi-layer, microporous membrane obtained by lamination is preferably stretched in at least one direction. The stretching of the multi-layer, microporous membrane can be conducted by a roll method, a tenter method, etc. while heating, as described above. The stretching of the multi-layer, microporous membrane can be monoaxial or biaxial. The biaxial stretching can be simultaneous biaxial stretching or sequential stretching, though the simultaneous biaxial stretching is preferable.

When the polyethylene resin in the first microporous layer in the multi-layer, microporous membrane is the polyethylene composition, the stretching temperature is preferably equal to or lower than the melting point of the polyethylene composition in the first microporous layer, more preferably in a range from the crystal dispersion temperature to the melting point. When the stretching temperature exceeds the melting point, the compression resistance is deteriorated, and there is large unevenness of properties (particularly air permeability) in a width direction when stretched in a transverse direction (TD). When it is lower than the crystal dispersion temperature, the polyethylene resin is insufficiently softened, making it likely that the membrane is broken by stretching, thus failing to achieve uniform stretching. Specifically, the stretching temperature is usually in a range of 90 to 135° C., preferably in a range of 95 to 130° C.

The stretching magnification of the multi-layer, microporous membrane is preferably 1.1-fold to 2.5-fold in one direction, to improve the compression resistance of the multi-layer, microporous membrane. In the case of monoaxial stretching, for instance, it is 1.1-fold to 2.5-fold in MD or TD. In the case of biaxial stretching, it is 1.1-fold to 2.5-fold in both MD and TD. In the case of biaxial stretching, the stretching magnification can be different between MD and TD as long as it is within a range of 1.1-fold to 2.5-fold in both MD and TD, but the same stretching magnification is preferable in both direction. When this magnification is less than 1.1-fold, the compression resistance is not fully improved. When this magnification is more than 2.5-fold, the membrane is highly likely broken, and the dimensional stability is undesirably deteriorated. This stretching magnification is more preferably 1.1-fold to 2.0-fold.

(8) Heat Treatment

The laminated or stretched multi-layer, microporous membrane is preferably heat-treated. The heat treatment stabilizes crystals and makes lamellas uniform. The heat treatment can be heat setting and/or annealing. When the polyethylene resin in the first microporous layer is the polyethylene composition, the heat-setting treatment is conducted at a temperature equal to or lower than the melting point of the polyethylene composition+10° C., preferably at a temperature in a range from the crystal dispersion temperature to the melting point. The heat-setting treatment can be conducted by a tenter method, a roll method or a rolling method.

The annealing can be conducted using a belt conveyer or an air-floating furnace in addition to the above method. When the polyethylene resin in the first microporous layer is the polyethylene composition, the annealing is conducted at a temperature equal to or lower than the melting point of the polyethylene composition, preferably at a temperature in a range from 60° C. to the melting point −10° C. Such annealing provides multi-layer, microporous membrane with high strength and good permeability. The heat-setting and the annealing can be combined.

(9) Cross-Linking of Membrane

The multi-layer, microporous membrane after laminated or stretched can be cross-linked by ionizing radiation such as α-rays, β-rays, γ-rays, electron beams, etc. The electron beam is preferably irradiated at an electron dose of 0.1 to 100 Mrad and accelerating voltage of 100 to 300 kV. The cross-linking treatment elevates the meltdown temperature of the multi-layer, microporous polyethylene membrane.

(10) Hydrophilizing

The laminated or stretched, multi-layer, microporous membrane can be hydrophilized. The hydrophilizing treatment can be a monomer-grafting treatment, a surfactant treatment, a corona-discharging treatment, etc. The monomer-grafting treatment is preferably conducted after cross-linking.

In case of the surfactant treatment, any of nonionic surfactants can be used, such as cationic surfactants, anionic surfactants and amphoteric surfactants, but the nonionic surfactants are preferable. The multi-layer, microporous membrane is dipped in a solution of the surfactant in water or a lower alcohol such as methanol, ethanol, isopropyl alcohol, etc., or coated with the solution by a doctor blade method.

(B) Second Production Method

The second production method differs from the first production method only in that the membrane-forming solvent is removed after the stretched, first and/or second gel-like sheets are heat-set.

(C) Third Production Method

The third production method differs from the first production method, only in that the unwashed, stretched, first and/or second gel-like sheets and/or the washed, first and/or second microporous polyolefin membranes are brought into contact with a hot solvent. Accordingly, only the hot solvent treatment will be explained below.

The hot solvent treatment is preferably conducted on the unwashed, stretched, first and second gel-like sheets. Solvents usable for the heat treatment are preferably the same as the above liquid membrane-forming solvents, more preferably liquid paraffin. The heat treatment solvents can be the same as or different from those used for producing the first and second polyolefin solutions.

The hot solvent treatment method is not particularly restricted as long as the stretched gel-like sheet or microporous membrane comes into contact with a hot solvent. It includes, for instance, a method of directly contacting the stretched gel-like sheet or microporous membrane with a hot solvent (hereinafter called simply "direct method" unless otherwise mentioned), a method of contacting the stretched gel-like sheet or microporous membrane with a cold solvent and then heating it (hereinafter called simply "indirect method" unless otherwise mentioned), etc. The direct method includes a method of immersing the stretched gel-like sheet or microporous membrane in a hot solvent, a method of spraying a hot solvent to the stretched gel-like sheet or microporous membrane, a method of coating the stretched gel-like sheet or microporous membrane with a hot solvent, etc., and the immersing method is preferable for uniform treatment. In the indirect method, the stretched gel-like sheet or microporous membrane is immersed in a cold solvent, sprayed with a cold solvent, or coated with a cold solvent, and then brought into contact with a hot roll, heated in an oven, or immersed in a hot solvent.

With the treating temperature and time varied in the hot solvent treatment step, the pore size and porosity of the membrane can be changed. When the polyethylene resin in the stretched gel-like sheet or microporous membrane is the polyethylene composition, the hot solvent temperature is preferably in a range from the crystal dispersion temperature of the polyethylene composition to its melting point +10° C. Specifically, the hot solvent temperature is preferably 110 to 140° C., more preferably 115 to 135° C. The contact time is preferably 0.1 seconds to 10 minutes, more preferably 1 second to 1 minute. When the hot solvent temperature is lower than the crystal dispersion temperature, or when the contact time is less than 0.1 seconds, the hot solvent treatment is substantially not effective, failing to improve permeability. On the other hand, when the hot solvent temperature is higher than the melting point +10° C., or when the contact time is more than 10 minutes, the microporous membrane undesirably deteriorates strength or ruptures.

After the hot solvent treatment, the stretched gel-like sheet or microporous membrane is washed to remove the remaining heat treatment solvent. Because the washing method per se can be the same as the above method of removing a membrane-forming solvent, description will be omitted. Needless to say, when the hot solvent treatment is conducted on the stretched gel-like sheet, the heat treatment solvent can be also removed by the above method of removing a membrane-forming solvent.

Such hot solvent treatment provides fibrils formed by stretching with leaf-vein-like structures having relatively thick fiber trunks. Accordingly, the microporous membrane having a large pore size and excellent strength and permeability can be obtained. The term "fibrils with leaf-vein-like structures" means fibrils having thick trunks and thin fibers extending therefrom in a complicated network structure. The heat-setting treatment before washing can be conducted not only in the second production method, but also in the third production method. Namely, the heat-setting treatment can be conducted on the gel-like sheet before and/or after the hot solvent treatment in the third production method.

(D) Fourth Production Method

The fourth production method differs from the first production method, only in that the first and second polyolefin solutions are simultaneously extruded from a die or dies, that a laminar extrudate is formed, that the laminar extrudate is cooled to provide a multi-layer, gel-like sheet, that the multi-layer, gel-like sheet is stretched and deprived of a membrane-forming solvent, and that the resultant multi-layer, microporous membrane is dried. The stretching method, the method of removing a membrane-forming solvent, and the drying method can be the same as described above. Accordingly, only the step of forming a multi-layer, gel-like sheet will be described.

The first and second polyolefin solutions obtained by melt-blending are simultaneously extruded through a die or dies directly from each extruder or via another extruder, or cooled to pellets and then simultaneously extruded from extruders through a die or dies. In simultaneous extrusion, the first and second polyolefin solutions can be combined in a laminar manner in one die and then extruded in the form of a sheet (bonding inside the die), or extruded from separate dies in the form of a sheet and laminated outside the die (bonding outside the die), though the former is preferable.

In the simultaneous extrusion, either a flat die method or an inflation method can be used. To achieve the bonding inside the die in either method, a method of supplying each solution to each manifold connected to a multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed explanation will be omitted. For instance, a known flat or inflation die can be used to form a multi-layer extrudate. The multi-layer-forming flat die preferably has a gap of 0.1 to 5 mm. When bonding is conducted outside the die by the flat die method, sheet-shaped solutions extruded through each die can be laminated under pressure between a pair of rolls. In any method described above, the die is heated at a temperature of 140 to 250° C. during extrusion. The extrusion speed of the heated solution is preferably 0.2 to 15 m/minute. The laminar extrudate thus formed is cooled to form a multi-layer, gel-like sheet. The cooling speed, temperature and method of the laminar extrudate can be the same as in the first production method.

(E) Fifth Production Method

The fifth production method differs from the fourth production method, only in that after the stretched, multi-layer, gel-like sheet is heat-set, the membrane-forming solvent is removed.

(F) Sixth Production Method

The sixth production method differs from the fourth production method, only in that the unwashed, stretched, multi-layer, gel-like sheet and/or the washed, multi-layer, microporous membrane are brought into contact with a hot solvent. The hot solvent treatment method can be the same as in the third production method.

[3] Properties of Multi-Layer, Microporous Polyolefin Membrane

The multi-layer, microporous polyolefin membrane produced by the above methods has the following properties.

(1) Air permeability of 20 to 400 seconds/100 cm$^3$ (converted to the Value at 20-μm Thickness)

When the air permeability is in a range from 20 to 400 seconds/100 cm$^3$, batteries having separators formed by the multi-layer, microporous membrane have large capacity and good cycle property. When the air permeability is less than 20 seconds/100 cm$^3$, shutdown does not fully occur when the temperature is elevated in the batteries.

(2) Porosity of 25 to 80%

With the porosity of less than 25%, the multi-layer, microporous membrane does not have good air permeability. When the porosity exceeds 80%, the multi-layer, microporous membrane used as a battery separator does not have enough strength, resulting in a high likelihood of short-circuiting between electrodes.

(3) Pin puncture strength of 3,000 mN/20 μm or More

With the pin puncture strength of less than 3,000 mN/20 μm, a battery comprising the microporous membrane as a separator likely suffers short-circuiting between electrodes. The pin puncture strength is more preferably 3,500 mN/20 μm or more.

(4) Tensile Rupture Strength of 100,000 kPa or More

With the tensile rupture strength of 100,000 kPa or more in both longitudinal direction (MD) and transverse direction (TD), the membrane is unlikely ruptured.

(5) Tensile Rupture Elongation of 100% or More

With the tensile rupture elongation of 100% or more in both longitudinal direction (MD) and transverse direction (TD), the membrane is unlikely ruptured.

(6) Heat Shrinkage Ratio of 10% or Less

When the heat shrinkage ratio exceeds 10% in both longitudinal direction (MD) and transverse direction (TD) after exposed to 105° C. for 8 hours, battery separators formed by the multi-layer, microporous membrane shrink by heat generated by the batteries, resulting in high likelihood of short-circuiting in their end portions. The heat shrinkage ratio is preferably 8% or less in both MD and TD.

(7) Shutdown Temperature of 140° C. or Lower

When the shutdown temperature exceeds 140° C., a lithium battery separator formed by the multi-layer, microporous membrane has low shutdown response property when overheated.

(8) Shutdown Temperature Difference within 10° C.

When the SD temperature difference is more than 10° C. between the first microporous layer and the second microporous layer, a lithium battery separator formed by the multi-layer, microporous membrane has low shutdown response property when overheated. This difference is preferably within 7° C.

(9) Shutdown Speed of 10 Seconds or Less

When the SD speed at 135° C. exceeds 10 seconds, a lithium battery separator formed by the multi-layer, microporous membrane has low shutdown response property when overheated. The SD speed is preferably 7 second or less.

(10) Meltdown Temperature of 160° C. or Higher

The meltdown temperature is preferably 170° C. or higher.

(11) 20 g/500 m or less of Powder Generated when Slitting

When the amount of powder generated when slitting is more than 20 g/500 m, the multi-layer, microporous membrane products are likely to have defects such as pinholes, dots, etc.

[4] Battery Separator

The thickness of the battery separator formed by the above multi-layer, microporous polyolefin membrane is preferably 3 to 200 μm, more preferably 5 to 50 μm, particularly 10 to 35 μm, though properly selected depending on the types of batteries.

[5] Battery

The multi-layer, microporous polyolefin membrane of this invention can be used preferably as a separator for secondary batteries such as nickel-hydrogen batteries, nickel-cadmium batteries, nickel-zinc batteries, silver-zinc batteries, lithium secondary batteries, lithium polymer secondary batteries, etc., particularly as a separator for lithium secondary batteries. The lithium secondary battery will be described below as an example.

The lithium secondary battery comprises a cathode and an anode laminated via a separator, the separator containing an electrolytic solution (electrolyte). The electrode can be of any known structure, not particularly critical. The electrode structure can be, for instance, a coin type in which discshaped cathode and anode are opposing, a laminate type in which planar cathode and anode are alternately laminated, a toroidal type in which ribbon-shaped cathode and anode are wound, etc.

The cathode usually comprises a current collector, and a cathodic active material layer capable of absorbing and discharging lithium ions, which is formed on the current collector. The cathodic active materials can be inorganic compounds such as transition metal oxides, composite oxides of lithium and transition metals (lithium composite oxides), transition metal sulfides, etc. The transition metals can be V, Mn, Fe, Co, Ni, etc. Preferred examples of the lithium composite oxides are lithium nickelate, lithium cobaltate, lithium manganate, laminar lithium composite oxides based on $\alpha$-NaFeO$_2$, etc. The anode comprises a current collector, and an anodic active material layer formed on the current collector. The anodic active materials can be carbonaceous materials such as natural graphite, artificial graphite, cokes, carbon black, etc.

The electrolytic solutions can be obtained by dissolving lithium salts in organic solvents. The lithium salts can be LiClO$_4$, LiPF$_6$, LiAsF$_6$, LiSbF$_6$, LiBF$_4$, LiCF$_3$SO$_3$, LiN(CF$_3$SO$_2$)$_2$, LiC(CF$_3$SO$_2$)$_3$, Li$_2$B$_{10}$Cl$_{10}$, LiN(C$_2$F$_5$SO$_2$)$_2$, LiPF$_4$(CF$_3$)$_2$, LiPF$_3$(C$_2$F$_5$)$_3$, lower aliphatic carboxylates of lithium, LiAlCl$_4$, etc. The lithium salts can be used alone or in combination. The organic solvents can be organic solvents having high boiling points and high dielectric constants such as ethylene carbonate, propylene carbonate, ethylmethyl carbonate, γ-butyrolactone, etc.; and organic solvents having low boiling points and low viscosity such as tetrahydrofuran, 2-methyltetrahydrofuran, dimethoxyethane, dioxolane, dimethyl carbonate, diethyl carbonate, etc. These organic solvents can be used alone or in combination. Because organic solvents having high dielectric constants have high viscosity, and because those having low viscosity have low dielectric constants, their mixtures are preferably used.

When the battery is assembled, the separator can be impregnated with the electrolytic solution, so that the separator (multi-layer, microporous membrane) is provided with ion permeability. The impregnation treatment is usually conducted by immersing the multi-layer, microporous membrane in the electrolytic solution at room temperature. When a cylindrical battery is assembled, for instance, a cathode sheet, a separator formed by the multi-layer, microporous membrane, and an anode sheet are laminated in this order, and the resultant laminate is wound to a toroidal-type electrode element. The resulting electrode element can be charged into a battery can and impregnated with the above electrolytic solution. The resulting electrode element can be charged into a battery can and impregnated with the above electrolytic solution. A battery lid acting as a cathode terminal equipped with a safety valve can be caulked to the battery can via a gasket to produce a battery.

This invention will be described in more detail with reference to Examples below without intention of restricting the scope of this invention.

Example 1

(1) Production of First Microporous Polyolefin Membrane

Dry-blended were 100 parts by mass of a polyethylene composition comprising 20% by mass of ultra-high-molecular-weight polyethylene (UHMWPE) having a mass-average molecular weight (Mw) of $2.0 \times 10^6$, and 80% by mass of high-density polyethylene (HDPE) having Mw of $3.5 \times 10^5$, and 0.2 parts by mass of tetrakis [methylene-3-(3,5-ditertiary-butyl-4-hydroxyphenyl)-propionate]methane as an antioxidant, to prepare a mixture. The polyethylene (PE) composition comprising UHMWPE and HDPE had a melting point of 135° C. and a crystal dispersion temperature of 100° C.

The Mws of UHMWPE and HDPE were measured by a gel permeation chromatography (GPC) method under the following conditions.

Measurement apparatus: GPC-150C available from Waters Corporation,
Column: Shodex UT806M available from Showa Denko K.K.,
Column temperature: 135° C.,
Solvent (mobile phase): o-dichlorobenzene,
Solvent flow rate: 1.0 ml/minute,
Sample concentration: 0.1% by weight (dissolved at 135° C. for 1 hour),
Injected amount: 500 μl,
Detector: Differential Refractometer (RI detector) available from Waters Corp., and
Calibration curve: Produced from a calibration curve of a single-dispersion, standard polystyrene sample using a predetermined conversion constant.

30 parts by mass of the mixture was charged into a strong-blending double-screw extruder having an inner diameter of 58 mm and L/D of 42, and 70 parts by mass of liquid paraffin [35 cSt (40° C.)] was supplied to the double-screw extruder via its side feeder. Melt-blending was conducted at 230° C. and 250 rpm to prepare a first polyolefin solution. The resultant first polyolefin solution was supplied from the double-screw extruder to a T-die, extruded from the T-die, drawn by cooling rolls controlled at 20° C., and cooled at a cooling speed of 10° C./second to form a gel-like sheet.

Using a tenter-stretching machine, the gel-like sheet was simultaneously and biaxially stretched at 115° C., such that the stretching magnification was 5-fold in both longitudinal direction (MD) and transverse direction (TD). Fixed to an aluminum frame of 20 cm×20 cm, the stretched membrane was immersed in methylene chloride controlled at 25° C., and washed with the vibration of 100 rpm for 3 minutes. The resultant membrane was dried by air at room temperature to provide a first microporous polyolefin membrane.

(2) Production of Second Microporous Polyolefin Membrane

Dry-blended were 100 parts by mass of a polyolefin composition comprising 15% by mass of UHMWPE, 65% by mass of HDPE and 20% by mass of a propylene homopolymer (PP) having Mw of $5.3 \times 10^5$ and a heat of fusion of 96 J/g, and 0.2 parts by mass of the above antioxidant, to prepare a mixture. The polyethylene (PE) composition comprising UHMWPE and HDPE had a melting point of 135° C. and a crystal dispersion temperature of 100° C. The Mw of PP was measured by a GPC method like above.

The heat of fusion $\Delta H_m$ of polypropylene (PP) was measured as follows according to JIS K7122. A polypropylene sample was placed in a sample holder of a differential scanning calorimeter (DSC-System 7 available from Perkin Elmer, Inc.), heat-treated at 190° C. for 10 minutes in an nitrogen atmosphere, cooled to 40° C. at 10° C./minute, kept at 40° C. for 2 minutes, and heated to 190° C. at a speed of 10° C./minute. As shown in FIG. 1, a straight line was drawn as a baseline passing through points of 85° C. and 175° C. on a DSC curve (melting curve) obtained by a temperature-elevating process, and the area S of a hatched portion enclosed by the baseline and the DSC curve was calculated as an amount of heat. The heat of fusion $\Delta H_m$ (unit: J/g) was obtained by dividing the amount of heat (unit: J) by the mass (unit: g) of the sample.

25 parts by mass of the mixture was charged into another double-screw extruder of the same type as above, and 75 parts by mass of liquid paraffin [35 cSt (40° C.)] was supplied to the double-screw extruder via its side feeder. Melt-blending was conducted under the same conditions as above to prepare a second polyolefin solution. The second polyolefin solution was formed into a second microporous polyolefin membrane in the same manner as above.

(3) Lamination, Stretching and Annealing

Two first microporous polyolefin membranes were disposed on both surfaces of the second microporous polyolefin membrane, and caused to pass through a pair of rolls heated at a temperature of 110° C. for lamination at pressure of 0.5 MPa. The resultant multi-layer, microporous membrane was stretched to 1.6-fold in MD by multi-stage heating rolls at a temperature of 110° C., and stretched to 1.6-fold in TD by a tenter-stretching machine at a temperature of 110° C. The stretched membrane was then fixed to a tenter, and annealed at a temperature of 125° C. for 10 minutes to produce a 24.9-µm-thick, three-layer, microporous polyolefin membrane.

Example 2

A three-layer, microporous polyolefin membrane was produced in the same manner as in Example 1, except that the first microporous polyolefin membrane was produced using a polyethylene composition (melting point: 135° C., crystal dispersion temperature: 100° C.) comprising 30% by mass of UHMWPE and 70% by mass of HDPE.

Example 3

A three-layer, microporous polyolefin membrane was produced in the same manner as in Example 2, except that the second polyolefin solution at a concentration of 30% by mass was prepared using a polyolefin composition comprising 5% by mass of UHMWPE, 55% by mass of HDPE and 40% by mass of PP, (the PE composition comprising the UHMWPE and the HDPE having a melting point of 135° C. and a crystal dispersion temperature of 100° C.), and formed into the second microporous polyolefin membrane.

Example 4

A three-layer, microporous polyolefin membrane was produced in the same manner as in Example 2, except that the first and second gel-like sheets simultaneously and biaxially stretched were heat-set at a temperature of 123° C. for 10 minutes, and then washed.

Example 5

The first and second polyolefin solutions were prepared in separate double-screw extruders in the same manner as in Example 1, and supplied to a three-layer-film-forming T-die from each double-screw extruder, and extruded to form an extrudate laminated in the order of first PO solution/second PO solution/first PO solution. The extrudate was cooled by rolls controlled at 0° C. while drawing, to form a three-layer, gel-like sheet. Using a tenter-stretching machine, the three-layer, gel-like sheet was simultaneously and biaxially stretched at 115° C., such that the stretching magnification was 5-fold in both longitudinal direction (MD) and transverse direction (TD). The stretched three-layer, gel-like sheet was washed in the same manner as above, air-dried, fixed to a tenter, and annealed at 125° C. for 10 minutes to produce a 24.8-µm-thick, three-layer, microporous polyolefin membrane.

Comparative Example 1

(1) Production of Microporous Polyolefin Membrane A

A second polyolefin solution containing a PO composition A comprising 15% by mass of UHMWPE, 65% by mass of HDPE and 20% by mass of PP was prepared in the same manner as in Example 1 except for changing the concentration to 30% by mass, and formed into a microporous polyolefin membrane A for a surface layer in the same manner as in Example 1.

(2) Production of Microporous Polyolefin Membrane B

A first polyolefin solution containing a PO composition B comprising 20% by mass of UHMWPE and 80% by mass of HDPE was prepared in the same manner as in Example 1 except for changing the concentration to 25% by mass, and formed into a microporous polyolefin membrane B for an inner layer in the same manner as in Example 1.

(3) Production of Three-Layer Microporous Membrane

A three-layer, microporous polyolefin membrane was produced in the same manner as in Example 1, except that two microporous polyolefin membranes A for surface layers were laminated on both surfaces of the microporous polyolefin membrane B for an inner layer.

Comparative Example 2

(1) Production of Microporous Polyolefin Membrane A

A polyolefin solution having a concentration of 30% by mass was prepared in the same manner as in Example 1 except for using a polyolefin composition A comprising 8% by mass of UHMWPE, 32% by mass of HDPE and 60% by mass of PP (a PE composition comprising the UHMWPE and the HDPE having a melting point of 135° C. and a crystal dispersion temperature of 100° C.). The polyolefin solution was formed into a microporous polyolefin membrane A in the same manner as in Example 1.

(2) Production of Microporous Polyolefin Membrane B

A first polyolefin solution containing a PO composition B comprising 20% by mass of UHMWPE and 80% by mass of HDPE was prepared in the same manner as in Example 1 except for changing the concentration to 25% by mass, and formed into a microporous polyolefin membrane B for an inner layer in the same manner as in Example 1.

(3) Production of Three-Layer Microporous Membrane

A three-layer, microporous polyolefin membrane was produced in the same manner as in Example 1, except that two microporous polyolefin membranes A for surface layers were laminated on both surfaces of the microporous polyolefin membrane B for an inner layer.

Comparative Example 3

Microporous polyolefin membranes A and B were produced in the same manner as in Comparative Example 1. A two-layer, microporous polyolefin membrane was produced in the same manner as in Example 1, except that one microporous polyolefin membrane A and one microporous polyolefin membrane B were laminated.

Comparative Example 4

(1) Production of Microporous Polyolefin Membrane A

A first polyolefin solution containing a PO composition A comprising 20% by mass of UHMWPE and 80% by mass of HDPE was prepared, and formed into a microporous polyolefin membrane A for a surface layer in the same manner as in Example 1.

(2) Production of Microporous Polyolefin Membrane B

A polyolefin solution having a concentration of 25% by mass was prepared in the same manner as in Example 1 except for using a polyolefin composition B comprising 8% by mass of UHMWPE, 32% by mass of HDPE and 60% by mass of PP, a PE composition comprising the UHMWPE and the HDPE having a melting point of 135° C. and a crystal dispersion temperature of 100° C. The polyolefin solution was formed into a microporous polyolefin membrane B for an inner layer in the same manner as in Example 1.

(3) Production of Three-Layer Microporous Membrane

A three-layer, microporous polyolefin membrane was produced in the same manner as in Example 1, except that two microporous polyolefin membranes A for surface layers were laminated on both surfaces of the microporous polyolefin membrane B for an inner layer.

Comparative Example 5

(1) Production of Microporous Polyolefin Membrane A

A polyolefin solution having a concentration of 30% by mass was prepared in the same manner as in Example 1 except for using a polyolefin composition A comprising 10% by mass of UHMWPE, 40% by mass of HDPE and 50% by mass of PP (a PE composition comprising the UHMWPE and the HDPE having a melting point of 135° C. and a crystal dispersion temperature of 100° C.). The polyolefin solution was formed into a microporous polyolefin membrane A in the same manner as in Example 1 except for stretching the gel-like sheet to 1.6-fold in MD and 1.0-fold in TD.

(2) Production of Microporous Polyolefin Membrane B

A polyolefin solution having a concentration of 25% by mass was prepared in the same manner as in Example 1 except for using only PP, and formed into a microporous polyolefin membrane B in the same manner as in Example 1 except for stretching the gel-like sheet to 1.6-fold in MD and 1.0-fold in TD.

(3) Production of Two-Layer, Microporous Membrane

A two-layer, microporous polyolefin membrane was produced in the same manner as in Example 1, except that one microporous polyolefin membrane A and one microporous polyolefin membrane B were laminated.

Comparative Example 6

(1) Production of Microporous Polyolefin Membrane A

A first polyolefin solution containing a PO composition A comprising 20% by mass of UHMWPE and 80% by mass of HDPE was prepared, and formed into a microporous polyolefin membrane A for a surface layer in the same manner as in Example 1.

(2) Production of Microporous Polyolefin Membrane B

A polyolefin solution having a concentration of 25% by mass was prepared in the same manner as in Example 1 except for using a polyolefin composition B comprising 15% by mass of UHMWPE, 65% by mass of HDPE, and 20% by mass of PP having Mw of $4.9 \times 10^5$ and a heat of fusion of 70 J/g, a PE composition comprising the UHMWPE and the HDPE having a melting point of 135° C. and a crystal dispersion temperature of 100° C. The polyolefin solution was formed into a microporous polyolefin membrane B for an inner layer in the same manner as in Example 1.

(3) Production of Three-Layer Microporous Membrane

A three-layer, microporous polyolefin membrane was produced in the same manner as in Example 1, except that two microporous polyolefin membranes A for surface layers were laminated on both surfaces of the microporous polyolefin membrane B for an inner layer.

The properties of each multi-layer, microporous polyolefin membrane obtained in Examples 1 to 5 and Comparative Examples 1 to 6 were measured by the following methods. The shutdown temperature was measured not only on the multi-layer microporous membranes, but also the first and second microporous polyolefin membranes of Examples 1 to 5 and the microporous polyolefin membranes A and B of Comparative Examples 1 to 6. The results are shown in Tables 1 and 2.

(1) Average Thickness (μm)

The thickness of the multi-layer, microporous membrane was measured at an arbitrary longitudinal position and at a 5-mm interval over a length of 30 cm in a transverse direction (TD) by a contact thickness meter, and the measured thickness was averaged.

(2) Air Permeability (sec/100 cm³/20 μm)

The air permeability $P_1$ of the multi-layer, microporous membrane having a thickness $T_1$ was measured according to JIS P8117, and converted to air permeability $P_2$ at a thickness of 20 μm by the formula of $P_2 = (P_1 \times 20)/T_1$.

(3) Porosity (%)

It was measured by a mass method.

(4) Pin Puncture Strength (mN/20 μm) The maximum load was measured when a multi-layer, microporous membrane having a thickness $T_1$ was pricked with a needle of 1 mm in diameter with a spherical end surface (curvature radius R: 0.5 mm) at a speed of 2 mm/second. The measured maximum load $L_1$ was converted to the maximum load $L_2$ at a thickness of 20 μm by the formula of $L_2=(L_1 \times 20)/T_1$, which was regarded as pin puncture strength.

(5) Tensile Rupture Strength and Tensile Rupture Elongation

They were measured using a 10-mm-wide rectangular test piece according to ASTM D882.

(6) Heat Shrinkage Ratio (%)

The shrinkage ratio of the multi-layer, microporous membrane after exposed to 105° C. for 8 hours was measured three times in both longitudinal direction (MD) and transverse direction (TD) and the obtained 3 values were averaged.

(7) Shutdown Temperature

Using a heat/stress/distortion analyzer (TMA/SS6000 available from Seiko Instruments, Inc.), a test piece of 10 mm (TD)×3 mm (MD) was heated at a speed of 5° C./minute from room temperature while being longitudinally drawn under a load of 2 g. A temperature at an inflection point observed near the melting point was regarded as a shutdown temperature.

(8) Shutdown Speed

Each of multi-layer, microporous membrane samples was kept in contact with a plate controlled at 135° C. for various periods of time to measure its air permeability. Data thus obtained were used to determine a time period (second) until the air permeability reached 100,000 seconds/100 cm³ (converted to the value of 20-μm thickness), which was regarded as an SD speed.

(9) Meltdown Temperature (° C.)

Using the above heat/stress/distortion analyzer, a test piece of 10 mm (TD)×3 mm (MD) was heated at a speed of 5° C./minute from room temperature while being longitudinally drawn under a load of 2 g, to measure a temperature at which the test piece was ruptured by melting.

(10) Film Formability

A 500-m-long, multi-layer, microporous membrane was winded by a reel, set in a slitter, and cut to half along a running direction while being unwound at a speed of 50 m/minute, and each of the 500-m-long, slit sheets was caused to slide on a fixed bar and then wound around a reel. Powder attached to the fixed bar was recovered, and its mass was measured.

| No. | | Example 1 | Example 2 | Example 3 | Example 4 | Example 5 |
|---|---|---|---|---|---|---|
| Composition of Resin | | | | | | |
| Polyethylene Composition | | | | | | |
| UHMWPE | Mw$^{(1)}$ | $2.0 \times 10^6$ | $2.0 \times 10^6$ | $2.0 \times 10^6$ | $2.0 \times 10^6$ | $2.0 \times 10^6$ |
|  | wt. % | 20 | 30 | 30 | 30 | 20 |
| HDPE | Mw$^{(1)}$ | $3.5 \times 10^5$ | $3.5 \times 10^5$ | $3.5 \times 10^5$ | $3.5 \times 10^5$ | $3.5 \times 10^5$ |
|  | wt. % | 80 | 70 | 70 | 70 | 80 |
| Polyolefin Composition | | | | | | |
| UHMWPE | Mw$^{(1)}$ | $2.0 \times 10^6$ | $2.0 \times 10^6$ | $2.0 \times 10^6$ | $2.0 \times 10^6$ | $2.0 \times 10^6$ |
|  | wt. % | 15 | 15 | 5 | 15 | 15 |
| HDPE | Mw$^{(1)}$ | $3.5 \times 10^5$ | $3.5 \times 10^5$ | $3.5 \times 10^5$ | $3.5 \times 10^5$ | $3.5 \times 10^5$ |
|  | wt. % | 65 | 65 | 55 | 65 | 65 |
| PP | Mw$^{(1)}$ | $5.3 \times 10^5$ | $5.3 \times 10^5$ | $5.3 \times 10^5$ | $5.3 \times 10^5$ | $5.3 \times 10^5$ |
|  | wt. % | 20 | 20 | 40 | 20 | 20 |
| Heat of Fusion (J/g) | | 96 | 96 | 96 | 96 | 96 |
| Production Conditions | | | | | | |
| PE Composition Conc. (wt. %) | | 30 | 30 | 30 | 30 | 30 |
| PO Composition Conc. (wt. %) | | 25 | 25 | 30 | 25 | 25 |
| Co-Extrusion | | | | | | |
| Layer Structure$^{(2)}$ | | — | — | — | — | (I)/(II)/(I) |
| Mass Ratio$^{(3)}$ | | — | — | — | — | 33.5/33/33.5 |
| Stretching of Gel-Like Sheet Magnification (MD × TD)$^{(4)}$/Temp. (° C.) | | 5 × 5/115 | 5 × 5/115 | 5 × 5/115 | 5 × 5/115 | 5 × 5/115 |
| Heat-Setting of Gel-Like Sheet Temp. (° C.)/Time (minute) | | —/— | —/— | —/— | 123/10 | —/— |
| Lamination | | | | | | |
| Temperature (° C.) | | 110 | 110 | 110 | 110 | — |
| Pressure (MPa) | | 0.5 | 0.5 | 0.5 | 0.5 | — |
| Layer Structure$^{(5)}$ | | (I)/(II)/(I) | (I)/(II)/(I) | (I)/(II)/(I) | (I)/(II)/(I) | — |
| Mass Ratio$^{(6)}$ | | 33.5/33/33.5 | 33.5/33/33.5 | 33.5/33/33.5 | 33.5/33/33.5 | — |
| Stretching$^{(7)}$ Magnification (MD × TD)$^{(4)}$/Temp. (° C.) | | 1.6 × 1.6/110 | 1.6 × 1.6/110 | 1.6 × 1.6/110 | 1.6 × 1.6/110 | —/— |
| Annealing$^{(8)}$ Temp. (° C.)/time (minute) | | 125/10 | 125/10 | 125/10 | 125/10 | 125/10 |
| Properties | | | | | | |
| Average Thickness (μm) | | 24.9 | 24.8 | 25.0 | 24.9 | 24.8 |
| Air Permeability (sec/100 cm³/20 μm) | | 300 | 300 | 310 | 280 | 290 |

| No. | Example 1 | Example 2 | Example 3 | Example 4 | Example 5 |
|---|---|---|---|---|---|
| Porosity (%) | 44 | 43 | 40 | 48 | 43 |
| Pin Puncture Strength[9] | 410/4,018 | 450/4,410 | 400/3,920 | 440/4,312 | 430/4,214 |
| Tensile Rupture Strength[10] | | | | | |
| MD | 1,350/132,300 | 1,400/137,200 | 1,320/129,360 | 1,370/134,260 | 1,370/134,260 |
| TD | 1,220/119,560 | 1,290/126,420 | 1,210/118,580 | 1,260/123,480 | 1,280/125,440 |
| Tensile Rupture Elongation (%) MD/TD | 170/210 | 200/250 | 160/200 | 180/210 | 190/220 |
| Heat Shrinkage Ratio (%) MD/TD | 2/3 | 3/4 | 3/4 | 2/3 | 2/2 |
| SD Temperature (° C.)[11] | 135/132/135 | 135/132/135 | 136/132/136 | 135/132/135 | 135/132/135 |
| SD Speed (sec) | 3 | 4 | 5 | 3 | 3 |
| MD Temperature (° C.) | 175 | 178 | 180 | 175 | 175 |
| Film Formability | | | | | |
| Attached Powder (g) | Trace | Trace | Trace | Trace | Trace |

Note:
[1] Mw represents a mass-average molecular weight.
[2] (I) represents a first polyolefin solution, and (II) represents a second polyolefin solution.
[3] A solid content mass ratio of surface layer/inner layer/surface layer.
[4] MD represents a longitudinal direction, and TD represents a transverse direction.
[5] (I) represents a first microporous polyolefin membrane, and (II) represents a second microporous polyolefin membrane.
[6] A mass ratio of surface layer/inner layer/surface layer.
[7] The stretching of a multi-layer, microporous membrane.
[8] The annealing of a multi-layer microporous membrane.
[9] The units are g/20 μm and mN/20 μm.
[10] The units are kg/cm$^2$ and kPa.
[11] The SD temperatures (° C.) of a multi-layer, microporous membrane, a first microporous polyolefin membrane and a second microporous polyolefin membrane.

TABLE 2

| No. | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Composition of Resin | | | | | | | |
| PO Composition A | | | | | | | |
| UHMWPE | Mw[1] | $2.0 \times 10^6$ | $2.0 \times 10^6$ | $2.0 \times 10^6$ | $2.0 \times 10^6$ | $2.0 \times 10^6$ | $2.0 \times 10^6$ |
| | wt. % | 15 | 8 | 15 | 20 | 10 | 20 |
| HDPE | Mw[1] | $3.5 \times 10^5$ | $3.5 \times 10^5$ | $3.5 \times 10^5$ | $3.5 \times 10^5$ | $3.5 \times 10^5$ | $3.5 \times 10^3$ |
| | wt. % | 65 | 32 | 65 | 80 | 40 | 80 |
| PP | Mw[1] | $5.3 \times 10^5$ | $5.3 \times 10^5$ | $5.3 \times 10^5$ | — | $5.3 \times 10^5$ | — |
| | wt. % | 20 | 60 | 20 | — | 50 | — |
| Heat of Fusion (J/g) | | 96 | 96 | 96 | — | 96 | — |
| PO(Composition)B | | | | | | | |
| UHMWPE | Mw[1] | $2.0 \times 10^6$ | $2.0 \times 10^6$ | $2.0 \times 10^6$ | $2.0 \times 10^6$ | — | $2.0 \times 10^6$ |
| | wt. % | 20 | 20 | 20 | 8 | — | 15 |
| HDPE | Mw[1] | $3.5 \times 10^5$ | $3.5 \times 10^5$ | $3.5 \times 10^5$ | $3.5 \times 10^5$ | — | $3.5 \times 10^5$ |
| | wt. % | 80 | 80 | 80 | 32 | — | 65 |
| PP | Mw[1] | — | — | — | $5.3 \times 10^5$ | $5.3 \times 10^5$ | $4.9 \times 10^5$ |
| | wt. % | — | — | — | 60 | 100 | 20 |
| Heat of Fusion (J/g) | | — | — | — | 96 | 96 | 70 |
| Production Conditions | | | | | | | |
| PO composition A Conc. (wt. %) | | 30 | 30 | 30 | 30 | 30 | 30 |
| PO(composition) B Conc. (wt. %) | | 25 | 25 | 25 | 25 | 25 | 25 |
| Stretching of Gel-Like Sheet Magnification (MD × TD)[2]/Temp. (° C.) | | 5 × 5/115 | 5 × 5/115 | 5 × 5/115 | 5 × 5/115 | 1.6 × 1.0/115 | 5 × 5/115 |
| Heat-Setting of Gel-Like Sheet Temp. (° C.)/Time (minute) | | —/— | —/— | —/— | —/— | —/— | —/— |
| Lamination | | | | | | | |
| Temp. (° C.) | | 110 | 110 | 110 | 110 | 110 | 110 |
| Pressure (MPa) | | 0.5 | 0.5 | 0.5 | 0.5 | 0.5 | 0.5 |
| Layer Structure[3] | | A/B/A | A/B/A | A/B | A/B/A | A/B | A/B/A |
| Mass Ratio[4] | | 33.5/33/33.5 | 33.5/33/33.5 | 50/50 | 33.5/33/33.5 | 50/50 | 33.5/33/33.5 |
| Stretching[5] Magnification (MD × TD)[2]/Temp. (° C.) | | 1.6 × 1.6/110 | 1.6 × 1.6/110 | 1.6 × 1.6/110 | 1.6 × 1.6/110 | 1.6 × 1.6/110 | 1.6 × 1.6/110 |
| Annealing[6] Temp. (° C.)/time (minute) | | 125/10 | 125/10 | 125/10 | 125/10 | 125/10 | 125/10 |

TABLE 2-continued

| No. | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Properties | | | | | | |
| Average Thickness (μm) | 24.8 | 25.0 | 24.9 | 24.9 | 25.1 | 24.9 |
| Air Permeability (sec/100 cm$^3$/20 μm) | 350 | 400 | 340 | 380 | 450 | 350 |
| Porosity (%) | 38 | 36 | 39 | 38 | 34 | 38 |
| Pin Puncture Strength[7] | 350/3,430 | 320/3,136 | 370/3,626 | 360/3,528 | 300/2,940 | 350/3,430 |
| Tensile Rupture Strength[8] | | | | | | |
| MD | 1,250/122,500 | 1,200/117,600 | 1,230/120,540 | 1,260/123,480 | 1,190/116,620 | 1,240/121,520 |
| TD | 1,170/114,660 | 1,110/108,780 | 1,150/112,700 | 1,170/114,660 | 1,100/107,800 | 1,190/116,620 |
| Tensile Rupture Elongation (%) MD/TD | 145/190 | 120/180 | 130/170 | 110/150 | 100/100 | 160/200 |
| Heat Shrinkage Ratio (%) MD/TD | 6/4 | 8/7 | 6/4 | 7/8 | 12/13 | 6/5 |
| SD temperature (° C.)[9] | 140/140/133 | 170/170/132 | 140/140/132 | 165/132/165 | 170/145/170 | 135/132/135 |
| SD speed (sec) | 15 | 45 | 11 | 42 | 75 | 3 |
| MD Temperature (° C.) | 175 | 180 | 175 | 180 | 185 | 159 |
| film formability | | | | | | |
| Attached Powder (g) | 46 | 50 | 30 | Trace | 27 | Trace |

Note:
[1]Mw represents a mass-average molecular weight.
[2]MD represents a longitudinal direction, and TD represents a transverse direction.
[3]A represents a microporous polyolefin membrane A, and B represents a microporous polyolefin membrane B.
[4]A mass ratio of surface layer/inner layer/surface layer.
[5]The stretching of a multi-layer, microporous membrane.
[6]The annealing of a multi-layer microporous membrane.
[7]The units are g/20 μm and mN/20 μm.
[8]The units are kg/cm$^2$ and kPa.
[9]The SD temperatures (° C.) of a multi-layer, microporous membrane, a microporous PO membrane A and a microporous PO membrane B.

It is clear from Table 1 that because each multi-layer, microporous polyolefin membrane of Examples 1 to 5 comprised an inner layer and polyethylene resin layers provided on both surfaces of the inner layer, the inner layer being made of a polyethylene resin and polypropylene having a heat of fusion ($\Delta H_m$) of 90 J/g or more, the polypropylene content being 50% or less by mass based on 100% by mass of the total of the polyethylene resin and the polypropylene in the inner layer, it had as low an SD temperature as 136° C. or lower, the SD temperature difference between the surface layer and the inner layer being within 4° C., and exhibited an SD speed of 5 second or less, as high a meltdown temperature as 175° C. or higher, and good film formability (extremely little polypropylene dropping during slitting), as well as excellent mechanical properties, permeability and dimensional stability.

On the other hand, because the membranes of Comparative Examples 1 and 2 contained polypropylene not in the inner layer but in the outer layer, they had higher SD temperatures, lower SD speeds, more dropped polypropylene powder, and poorer mechanical strength and dimensional stability than those in Examples 1 to 5. Because the membrane of Comparative Example 2 contained much more polypropylene in the outer layer, it had as high an SD temperature as 170° C., as low an SD speed as 45 seconds, as large SD temperature difference as 38° C. between the surface layer and the inner layer, and poor permeability.

Because the two-layer membrane of Comparative Example 3 had a polypropylene-containing layer, it had a higher SD temperature, a lower SD speed, and more dropped polypropylene powder than those in Examples 1 to 5. It also had poorer mechanical strength and dimensional stability than those in Examples 1 to 5.

Because the membrane of Comparative Example 4 contained polypropylene only in the inner layer, the polypropylene content being more than 50% by mass based on 100% by mass of the total of the polyethylene resin and the polypropylene in the inner layer. Accordingly, despite its acceptable film formability, it had as high an SD temperature as 165° C., as low an SD speed as 42 seconds, and as large SD temperature difference as 33° C. between the surface layer and the inner layer. Further, it had poorer mechanical strength and dimensional stability than those in Examples 1 to 5.

Because the two-layer membrane of Comparative Example 5 had a polypropylene layer, it had as high an SD temperature as 170° C., as low an SD speed as 75 seconds, as large SD temperature difference as 25° C. between the surface layer and the inner layer, and more dropped polypropylene powder than those in Examples 1 to 5. Further, it had poorer permeability, mechanical strength and dimensional stability than those in Examples 1 to 5.

Because the inner layer in the membrane of Comparative Example 6 contained polypropylene having a heat of fusion ($\Delta H_m$) of less than 90 J/g, it had a meltdown temperature of 159° C., lower than those (175 to 180° C.) of Examples 1 to 5.

EFFECT OF THE INVENTION

The multi-layer, microporous polyolefin membrane of this invention has a low shutdown temperature, a high shutdown speed and a high meltdown temperature, and excellent film formability, mechanical properties, permeability and dimensional stability. The use of such multi-layer, microporous polyolefin membranes for separators provides batteries with excellent safety such as heat resistance, compression resistance, etc., and productivity.

What is claimed is:
1. A multi-layer, microporous polyolefin membrane having at least three layers, which comprises first microporous layers comprising a polyethylene resin for constituting at least both surface layers, and at least one second microporous layer comprising a polyethylene resin and polypropyl- ene and disposed between both surface layers, the polyethylene resin in the first and second microporous layers having a melting point of 130° C. to 140° C., the heat of fusion ($\Delta H_m$) of the polypropylene measured by differential scanning calorimetry being 90 J/g or more, and the polypropylene content in the second microporous layer being 3 to 45% by mass based on 100% by mass of the total of the polyethylene resin and the polypropylene.

2. A battery separator formed by a multi-layer, microporous polyolefin membrane having at least three layers, the multi-layer, microporous polyolefin membrane comprising first microporous layers comprising of a polyethylene resin for constituting at least both surface layers, and at least one second microporous layer comprising a polyethylene resin and polypropylene and disposed between both surface layers, the polyethylene resin in the first and second microporous layers having a melting point of 130° C. to 140° C., the heat of fusion ($\Delta H_m$) of the polypropylene measured by differential scanning calorimetry being 90 J/g or more, the polypropylene content in the second microporous layer being 3 to 45% by mass based on 100% by mass of the total of the polyethylene resin and the polypropylene.

3. The multi-layer, microporous polyolefin membrane according to claim 1, wherein said polyethylene resin is a composition of ultra-high-molecular-weight polyethylene having a mass-average molecular weight of $5 \times 10^5$ or more and high-density polyethylene having a mass-average molecular weight of $1 \times 10^4$ or more and less than $5 \times 10^5$.

4. The battery separator according to claim 2, wherein said polyethylene resin is a composition of ultra-high-molecular-weight polyethylene having a mass-average molecular weight of $5 \times 10^5$ or more and high-density polyethylene having a mass-average molecular weight of $1 \times 10^4$ or more and less than $5 \times 10^5$.

* * * * *